United States Patent
Huang et al.

(10) Patent No.: US 9,019,808 B2
(45) Date of Patent: Apr. 28, 2015

(54) METHOD FOR TRANSFERRING DATA STREAM

(71) Applicant: Institute for Information Industry, Taipei (TW)

(72) Inventors: Chung-Ming Huang, Tainan (TW); Yuan-Tse Yu, Kaohsiung (TW); Tzu-Hua Lin, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 275 days.

(21) Appl. No.: 13/716,209

(22) Filed: Dec. 17, 2012

(65) Prior Publication Data

US 2014/0146658 A1    May 29, 2014

(30) Foreign Application Priority Data

Nov. 23, 2012 (TW) ............................. 101144010 A

(51) Int. Cl.
  *H04L 12/801* (2013.01)
  *H04L 1/16* (2006.01)
  *H04W 28/10* (2009.01)

(52) U.S. Cl.
  CPC ............... *H04L 47/10* (2013.01); *H04L 1/1685* (2013.01); *H04W 28/10* (2013.01)

(58) Field of Classification Search
  None
  See application file for complete search history.

(56) References Cited

U.S. PATENT DOCUMENTS

| | | | |
|---|---|---|---|
| 5,796,949 A * | 8/1998 | Ishida et al. ................... 725/116 |
| 5,809,254 A * | 9/1998 | Matsuzono ................... 709/235 |
| 6,236,647 B1 * | 5/2001 | Amalfitano ................... 370/335 |
| 6,490,627 B1 * | 12/2002 | Kalra et al. ................... 709/231 |
| 6,925,057 B2 * | 8/2005 | Cheng et al. ................... 370/235 |
| 6,925,502 B1 * | 8/2005 | Abbasi et al. ................. 709/232 |
| 7,080,400 B1 | 7/2006 | Navar |
| 7,243,134 B2 * | 7/2007 | Bruner et al. ................. 709/216 |
| 7,275,093 B1 * | 9/2007 | Freed et al. ................... 709/223 |
| 7,532,629 B2 * | 5/2009 | Ebata ............................ 370/401 |
| 7,801,969 B2 * | 9/2010 | Nakajima et al. ............. 709/217 |
| 7,808,918 B2 | 10/2010 | Bugenhagen |
| 8,488,628 B2 * | 7/2013 | Hanov et al. .................. 370/470 |
| 2002/0051466 A1 * | 5/2002 | Bruckman ..................... 370/474 |
| 2002/0184383 A1 * | 12/2002 | Song ............................. 709/236 |
| 2003/0037158 A1 * | 2/2003 | Yano et al. .................... 709/232 |
| 2003/0107994 A1 * | 6/2003 | Jacobs et al. .................. 370/235 |
| 2004/0010736 A1 * | 1/2004 | Alapuranen ................... 714/100 |
| 2004/0078822 A1 | 4/2004 | Breen et al. |
| 2004/0180696 A1 * | 9/2004 | Foore et al. ................... 455/561 |
| 2006/0039413 A1 * | 2/2006 | Nakajima et al. ............. 370/521 |
| 2006/0159098 A1 * | 7/2006 | Munson et al. ............... 370/394 |
| 2007/0136481 A1 * | 6/2007 | Dierks et al. .................. 709/228 |
| 2007/0248025 A1 * | 10/2007 | Phan et al. .................... 370/252 |
| 2007/0253490 A1 * | 11/2007 | Makino ..................... 375/240.24 |
| 2007/0286279 A1 * | 12/2007 | Hamanaka ............... 375/240.12 |

(Continued)

*Primary Examiner* — Dung B Huynh
(74) *Attorney, Agent, or Firm* — CKC & Partners Co., Ltd.

(57) ABSTRACT

A method for transmitting data stream includes the steps of analyzing a request to generate a transmitting command, calculating a data receiving ability of a receiving end when receiving the transferring command, calculating an I frame dividing rate, a P frame dividing rate, and a B frame dividing rate based on the data receiving ability, dividing an I frame, a P frame, and a B frame based on the I frame dividing rate, the P frame dividing rate, and the B frame dividing rate to generate a plurality of I frame segments, P frame segments, and B frame segments, transmitting the I frame segments, P frame segments, and B frame segments of the data stream to the receiving end in turn base on the data receiving ability.

9 Claims, 4 Drawing Sheets

(56) References Cited

U.S. PATENT DOCUMENTS

| | | |
|---|---|---|
| 2008/0022005 A1* | 1/2008 | Wu et al. ............... 709/231 |
| 2008/0104013 A1* | 5/2008 | Saus ...................... 707/2 |
| 2008/0114889 A1* | 5/2008 | Deshpande ............ 709/231 |
| 2008/0232472 A1* | 9/2008 | Kwon ................... 375/240.13 |
| 2008/0273458 A1* | 11/2008 | Guo et al. ............. 370/229 |
| 2009/0059944 A1* | 3/2009 | Omino ................... 370/419 |
| 2009/0238130 A1* | 9/2009 | Nakatsugawa ......... 370/329 |
| 2009/0259766 A1* | 10/2009 | Karlsson et al. ...... 709/231 |
| 2010/0037263 A1 | 2/2010 | Riley et al. |
| 2010/0080173 A1* | 4/2010 | Takagi .................. 370/328 |
| 2010/0091772 A1* | 4/2010 | Cedervall et al. ..... 370/392 |
| 2010/0332678 A1* | 12/2010 | Accapadi et al. ...... 709/235 |
| 2011/0032428 A1* | 2/2011 | Bing ..................... 348/608 |
| 2011/0072078 A1 | 3/2011 | Chai et al. |
| 2012/0005165 A1* | 1/2012 | Tsai et al. ............. 707/652 |
| 2012/0030723 A1* | 2/2012 | Baum et al. ........... 725/105 |
| 2012/0327799 A1* | 12/2012 | Sandlund et al. ...... 370/252 |

* cited by examiner

METHOD FOR TRANSFERRING DATA STREAM

RELATED APPLICATIONS

This application claims priority to Taiwan Application Serial Number 101144010, filed Nov. 23, 2012, which is herein incorporated by reference.

BACKGROUND

1. Field of Invention

The embodiment of the present invention relates generally to a transmitting method and, more particularly, to a method for transmitting data stream.

2. Description of Related Art

In traditional package transmitting mechanism, when a transmitting end receives an ACK package transmitted from a receiving end, the transmitting end continuously transmits next package. That is to say, the transmitting end stops transmitting packages when the transmitting end does not receive the ACK package transmitted from the receiving end, or the transmitting end disconnects a communication with the receiving end directly when the transmitting end does not receive the ACK package transmitted from the receiving end for a period.

In addition, the bandwidth and the buffering space for transmitting the package are different owing to differences of a quality of a content of a film, the way to compress the film, and so on. When a user selects one of films, a client end download related streams of the film from a server. However, in this mode, there will be a bandwidth utilizing shake phenomenon happened in the server and the client end, and the quality of the film will be affected if the package disappears.

Many efforts have been devoted trying to find a solution of the aforementioned problems. Nonetheless, there still a need to improve the existing apparatus and techniques in the art.

SUMMARY

A method for transmitting data stream is provided, which addresses the to problem existing in the traditional package transmitting mechanism.

One aspect of the embodiment of the present invention is to provide the method for transmitting data stream. The method for transmitting data stream comprises the steps of:

analyzing a request to generate a transmitting command, wherein the transmitting command corresponds to a receiving end;

calculating data receiving ability of the receiving end when the transmitting command is received;

calculating a I frame dividing rate, a P frame dividing rate, and a B frame dividing rate of a stream according to the data receiving ability;

dividing an I frame, a P frame, and a B frame respectively according to the I frame dividing rate, the P frame dividing rate, and the B frame dividing rate to generate a plurality of I frame segments, P frame segments, and B frame segments; and transmitting the I frame segments, the P frame segments, and the B frame segments of the stream to the receiving end in turn according to the data receiving ability.

As a result, the embodiments of the present invention provide the method for transmitting data stream such that the network bandwidth utilizing variance can be decreased efficiently, the network bandwidth utilizing efficiency can be increased, and the quality of the film can also be increased due to there being a to schedule disposition mechanism when acquiring the stream of the film.

BRIEF DESCRIPTION OF THE DRAWINGS

The invention can be more fully understood by reading the following detailed description of the embodiments, with reference made to the is accompanying drawings as follows.

DETAILED DESCRIPTION

Figure 1:
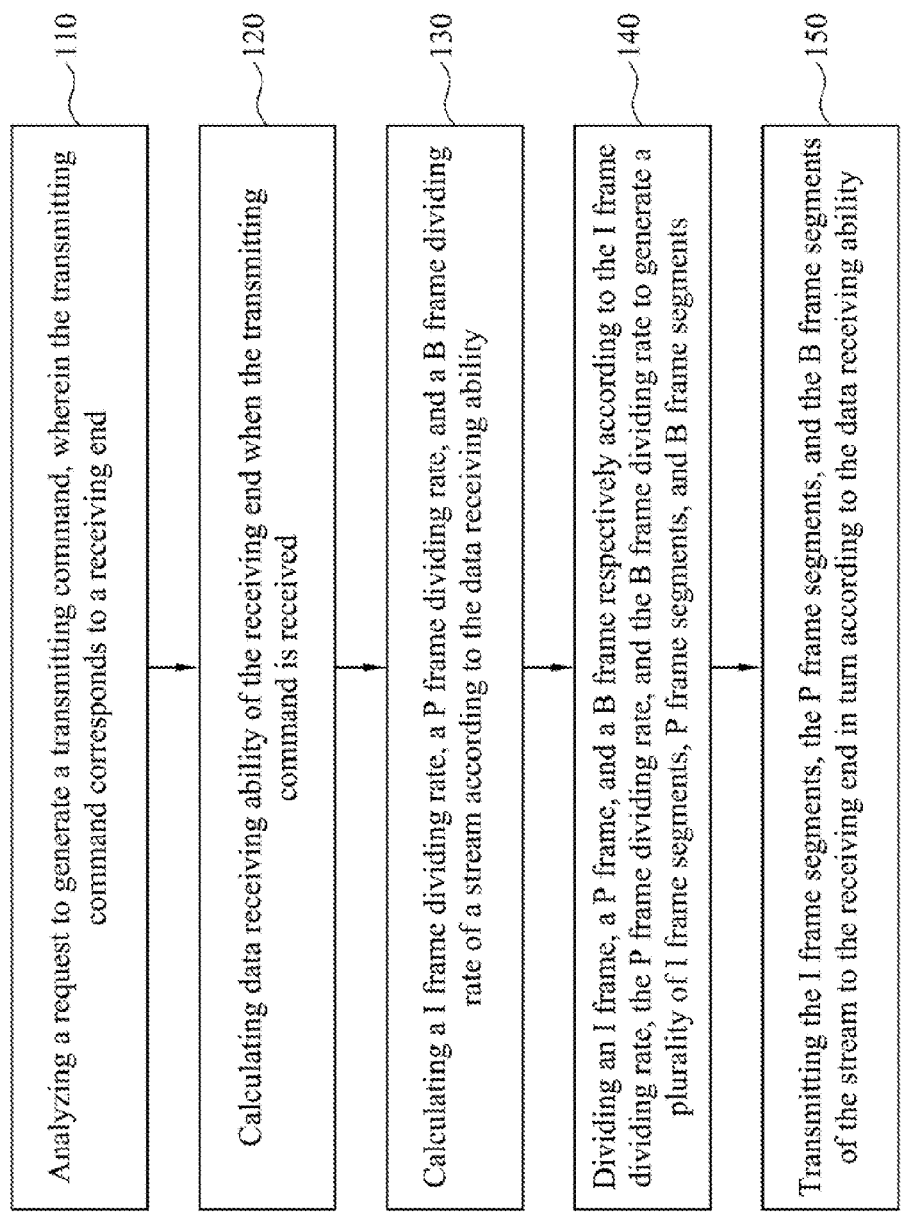
FIG. 1 schematically shows a flow diagram of a method for transmitting data stream according to embodiments of the present invention.

The present invention is more particularly described in the following to examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1 schematically shows a flow diagram of a method for transmitting data stream according to embodiments of the present invention. The method 100 for transmitting data stream comprises the steps of:

Step 110: analyzing a request to generate a transmitting command, wherein the transmitting command corresponds to a receiving end;

Step 120: calculating data receiving ability of the receiving end when the transmitting command is received;

Step 130: calculating a I frame dividing rate, a P frame dividing rate, and a B frame dividing rate of a stream according to the data receiving ability;

Step 140: dividing an I frame, a P frame, and a B frame respectively according to the I frame dividing rate, the P frame dividing rate, and the B frame dividing rate to generate a plurality of I frame segments, P frame segments, and B frame segments; and Step 150: transmitting the I frame segments, the P frame segments, and the B frame segments of the stream to the receiving end in turn according to the data receiving ability.

First of all, in step 110, a user employs a computer (receiving end) to submit a request, and the request is transmitted to a server (transmitting end) to through the network such that the server is implemented to analyze the request. When the requirement of the user is analyzed by the server, a transmitting command is generated. The transmitting command corresponds to the computer (receiving end) which the user employs; that is to say, the server (transmitting end) will transmit the data stream to the computer (receiving end) is according to the transmitting command.

Figure 2:
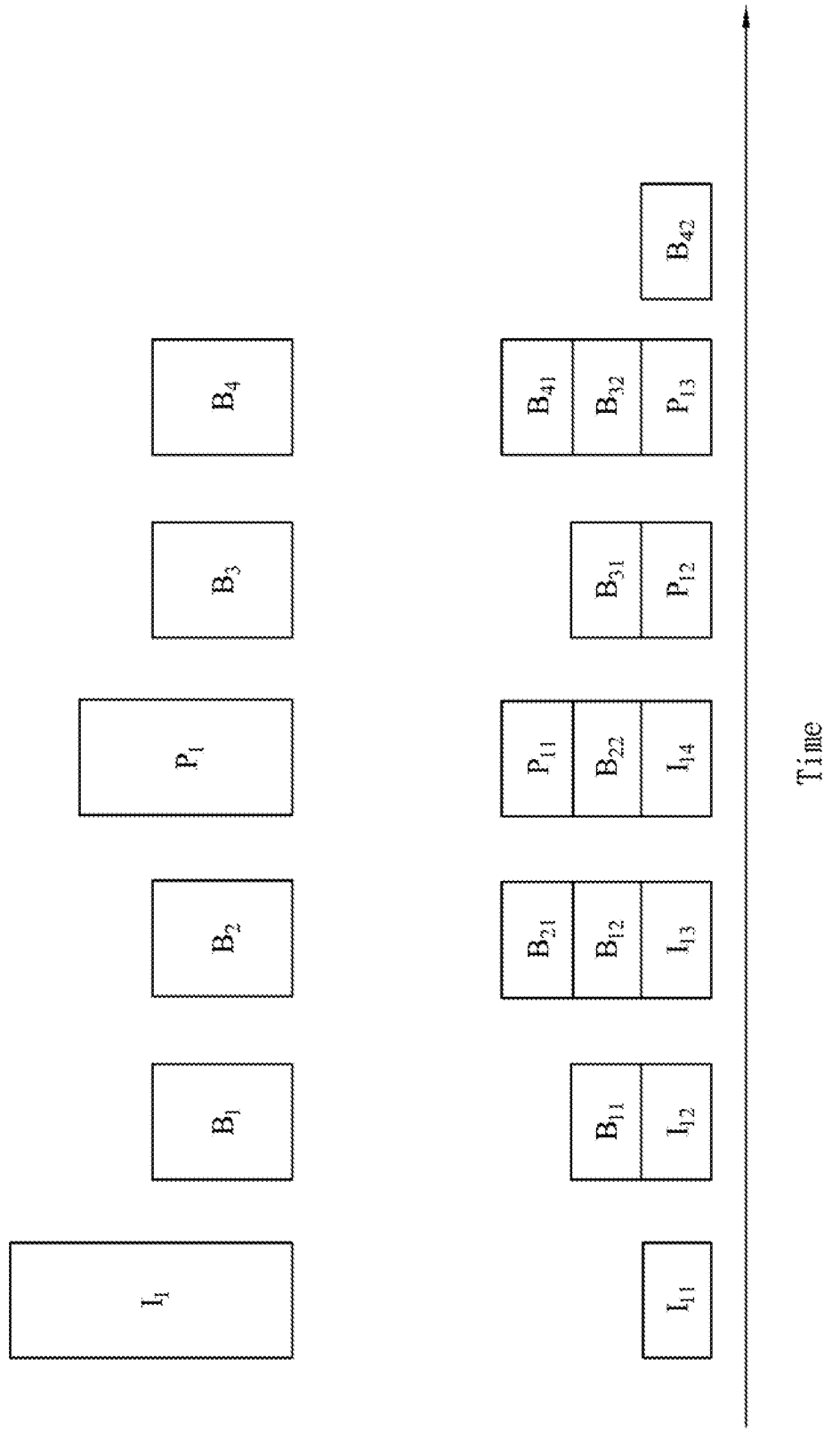
FIG. 2 schematically shows a format diagram of data stream of FIG. 1 according to embodiments of the present invention.

In one embodiment, the format of the data stream can be MPEG4. MPEG4 comprises I frame, P frame, and B frame. To make the flow of the method for transmitting data stream easier to be understood, reference is also made to FIG. 2. As shown in FIG. 2, it exemplarily depicts the content which the MPEG4 data stream comprises. As shown in the Figure, the data quantity of I frame $I_1$ is higher than that of B frame $B_1$ and P frame $P_1$, and the data quantity might over a receiving quantity of the receiving end if the I frame $I_1$ is transmitted to the receiving end directly, which results in the receiving end cannot receive the data quantity of the I frame $I_1$.

As a result, the embodiment of the present invention adopts a schedule disposition mechanism when acquiring the stream of the film, which can be depicted as FIG. 2. In FIG. 2, the I frame $I_1$ is divided into I frame segment $I_{11}$, I frame segment $I_{12}$, I frame segment $I_{13}$, and I frame segment and the $I_{14}$, and the I frame segments can be scheduled to transmit to the receiving end in turn. In addition, the P frame and B frame can adopt the same mechanism. As such, the data transmitting quantity of the embodiment of the present invention can be to transmitted to the receiving end separately and smoothly.

Furthermore, the implementation of the present invention will be described continuously. In step 120, when the server receives the transmitting command, the data receiving ability of the computer (receiving end), which can be the bandwidth of the computer, is calculated by the server. Where the data receiving ability can be calculated by the following formula:

$$Buf_{mean} = \frac{\#I_{GOP} * I_{mean} + \#P_{GOP} * P_{mean} + \#B_{GOP} * B_{mean}}{GOP},$$

where $Buf_{mean}$ is the data receiving ability, $\#I_{GOP}$ is the number of the I frame, $\#I_{mean}$ is the average value of the I frame, $\#P_{GOP}$ is the number of the P frame, $P_{mean}$ is the average value of the P frame, $\#B_{GOP}$ is the number of the B frame, $B_{mean}$ is the average value of the B frame, and GOP a size of a group of frames, wherein the group of frames comprises the I frame, the P frame, and the B frame.

As mentioned above, the embodiment of the present invention obtains the data receiving ability which the computer (receiving end) can receive. In step 130, an I frame dividing rate, a P frame dividing rate, and a B frame dividing rate of a stream can be calculated according to the data receiving ability. Where the I frame dividing rate, the P frame dividing rate, and the B frame dividing rate can be calculated by the following formula.

First of all, the I frame dividing rate is calculated by the following formula:

$$F_I = \left[\frac{I_{mean} + I^*_{sd}}{Buf_{mean} + Buf_{sd}}\right],$$

where $F_I$ is the I frame dividing rate, $I_{mean}$ is the average value of the I frame, $I^*_{sd}$ is the variance of the I frame, $Buf_{mean}$ is the data receiving ability, and $Buf_{sd}$ is the variance of the data receiving ability.

Subsequently, the B frame dividing rate is calculated by the following formula:

$$F_P = \left[\frac{P_{mean} + P^*_{sd}}{Buf_{mean} + Buf_{sd}}\right],$$

where $P_I$ is the P frame dividing rate, $P_{mean}$ is the average value of the P frame, $P^*_{sd}$ is the variance of the P frame, $Buf_{mean}$ is the data receiving ability, and $Buf_{sd}$ is the variance of the data receiving ability.

Eventually, the B frame dividing rate is calculated by the following $$F_B = \left[\frac{B_{mean} + B^*_{sd}}{Buf_{mean} + Buf_{sd}}\right],$$

where $B_I$ is the B frame dividing rate, $B_{mean}$ is the average value of the B frame, $B^*_{sd}$ is the variance of the B frame, $Buf_{mean}$ is the data receiving ability, and $Buf_{sd}$ is the variance of the data receiving ability.

After the I frame dividing rate, the P frame dividing rate, and the B frame dividing rate are obtained, in step 140, an I frame, a P frame, and a B frame can be divided by the server according to the I frame dividing rate, the P frame dividing rate, and the B frame dividing rate to generate a plurality of I frame segments, a plurality of P frame segments and a plurality of B frame segments. Where the I frame segments, the P frame segments, and the B frame segments can be calculated by the following formula.

In the beginning, the I frame segments can be calculated by the following $$f_i^I = \frac{FrameSize_i^I}{F_I},$$

where $f_i^I$ is the number of the I frame segments, $FrameSize_i^I$ is the size of the I frame, and $F_I$ is the I frame dividing rate.

Secondly, $$f_i^I = \frac{FrameSize_i^I}{F_I},$$

where $f_i^I$ is the number of the I frame segments, $FrameSize_i^I$ is the size of the I frame, and $F_p$ is the I frame dividing rate.

$$f_i^P = \frac{FrameSize_i^P}{F_P},$$

where $f_i^P$ is the number of the P frame segments, FrameSize$_i^P$ is the size of the P frame, and $F_P$ is the P frame dividing rate.

Next, the divided number of the B frame is calculated by the following formula:

$$f_i^B = \frac{FrameSize_i^B}{F_B},$$

wherein $f_i^B$ is the number of the B frame segments, FrameSize$_i^B$ is the size of the B frame, and $F_B$ is the B frame dividing rate.

After the I frame segments, the P frame segments, and the B frame segments are obtained, in step 150, the I frame segments, the P frame segments, and the B frame segments of the stream are transmitted to the receiving end in turn by the server according to the data receiving ability.

As a result, the embodiment of the present invention provides the method 100 for transmitting data stream such that the network bandwidth utilizing variance can be decreased efficiently, the network bandwidth utilizing efficiency can be increased due to there being a schedule disposition mechanism when acquiring the stream of the film.

Figure 3:
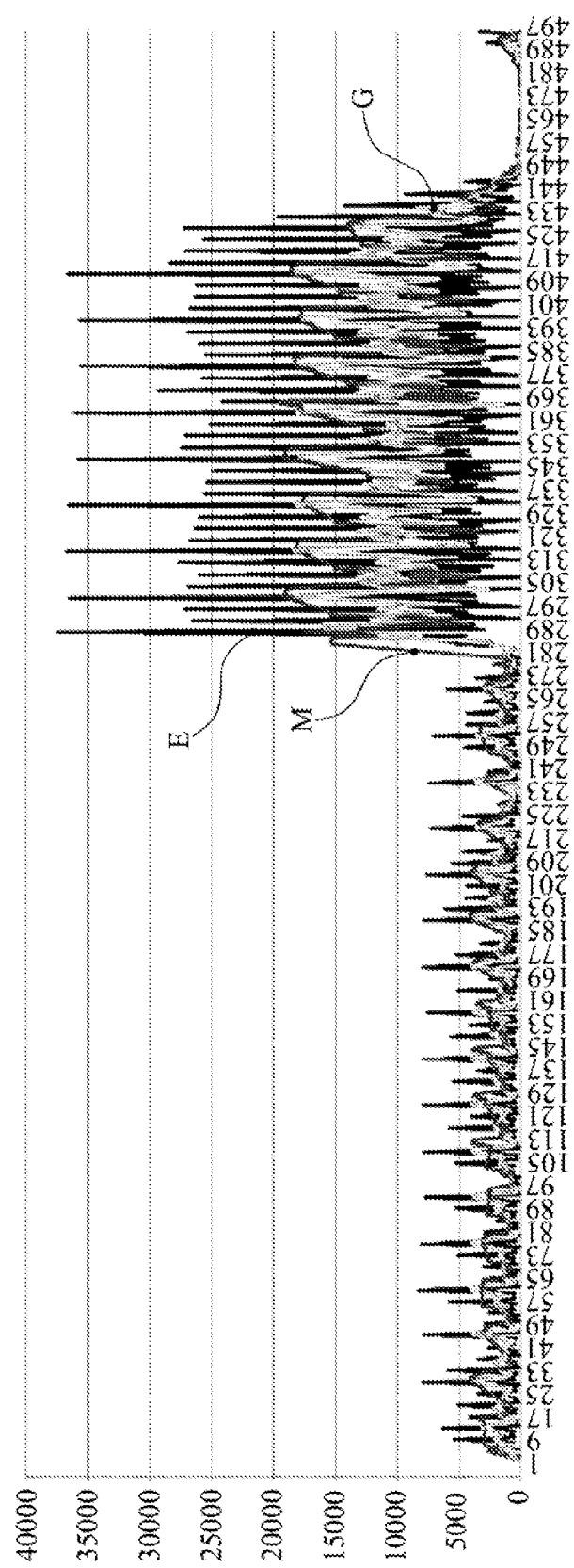
FIG. 3 schematically shows a result diagram of adopting the method for transmitting data stream of FIG. 1 according to embodiments of the present invention.

In addition, the result of adopting the method for transmitting data stream 100 of the embodiment of the present invention is as shown in FIG. 3. As shown in Figure, the curve E represents the result of adopting traditional transmitting manner, the curve G represents the result of adopting the method for transmitting data stream of the embodiment of the present invention, and curve M represents the average of the curve E and the curve G. It can be seen clearly from the Figure that the curve G of adopting the method for transmitting data stream is smoother so as to decrease the network bandwidth utilizing variance efficiently and increase the network bandwidth utilizing efficiency.

Furthermore, when there are pluralities of data streams which need to be transmitted, an I frame dividing rate, a P frame dividing rate, and a B frame dividing rate of one of a plurality of streams can be calculated by the server according to the data receiving ability. Subsequently, the I frame segments, the P frame segments, and the B frame segments of the streams can be transmitted to the receiving end in turn by the server according to the data receiving ability. That is to say, after a scheduling disposition of single data to stream is calculated by the server, a plurality of data streams can be added together. Subsequently, the scheduling disposition of the plurality of data streams can be implemented according to the data receiving ability of the receiving end.

Figure 4:
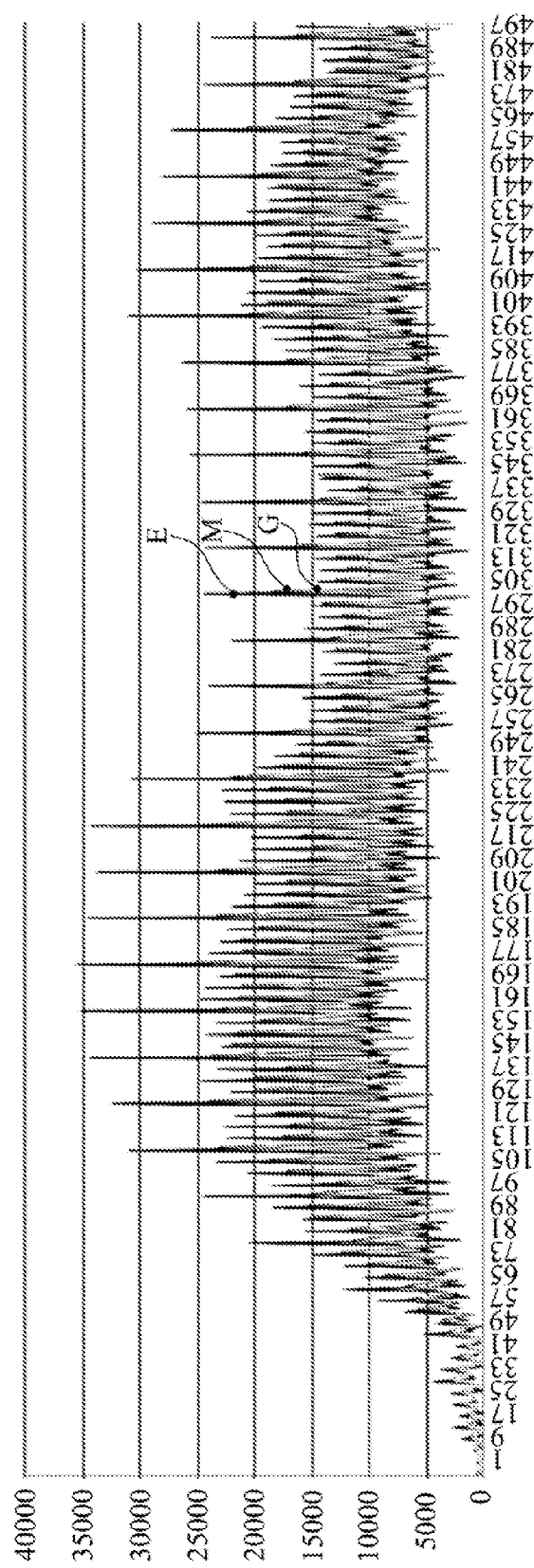
FIG. 4 schematically shows a result diagram of adopting the method for transmitting data stream of FIG. 1 according to embodiments of the present invention.

As mentioned above, the result of adopting the method 100 for transmitting data stream of the embodiment of the present invention is as shown in FIG. 4. As shown in Figure, the curve E represents the result of adopting traditional transmitting manner, and the curve G represents the result of adopting the method for transmitting data stream of the embodiment of the present invention. It can be seen clearly from FIG. 4 that the curve G of adopting the method for transmitting data stream is smoother so as to decrease the network bandwidth utilizing variance efficiently and increase the network bandwidth utilizing efficiency.

Those having skill in the art will appreciate that the method 100 for transmitting data stream can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the method 100 for transmitting data stream named after the function thereof is merely used to describe the technology in the embodiment of the present invention in detail but not limited to. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides the method for transmitting data stream such that the network bandwidth utilizing variance can be decreased efficiently, the network bandwidth utilizing efficiency can be increased, and the quality of the film can also be increased due to there being a schedule disposition mechanism when acquiring the stream of the film.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make to numerous alterations to the disclosed embodiments without departing from the spirit or scope of this invention, and the scope thereof is determined by the claims that follow.

What is claimed is:

1. A method for transmitting data stream, comprising:

analyzing a request to generate a transmitting command, wherein the transmitting command corresponds to a computer;

calculating data receiving ability of the computer when the transmitting command is received;

calculating a I frame dividing rate, a P frame dividing rate, and a B frame dividing rate of a stream according to the data receiving ability;

dividing an I frame, a P frame, and a B frame respectively according to the I frame dividing rate, the P frame dividing rate, and the B frame dividing rate to generate a plurality of I frame segments, P frame segments, and B frame segments; and transmitting the I frame segments, the P frame segments, and the B frame segments of the stream to the computer in turn by a server according to the data receiving ability, wherein the data receiving ability is calculated by the following formula:

$$Buf_{mean} = \frac{\#I_{GOP} * I_{mean} + \#P_{GOP} * P_{mean} + \#B_{GOP} * B_{mean}}{GOP},$$

where $Buf_{mean}$ is the data receiving ability, $\#I_{GOP}$ is the number of the I frame, $\#I_{mean}$ is the average value of the I frame, $\#P_{GOP}$ is the number of the P frame, $P_{mean}$ is the average value of the P frame, $\#B_{GOP}$ is the number of the B frame, $B_{mean}$ is the average value of the B frame, and GOP is a size of a group of frames, wherein the group of frames comprises the I frame, the P frame, and the B frame.

2. The method for transmitting data stream according to claim 1, wherein the I frame dividing rate is calculated by the following formula:

$$F_I = \left[ \frac{I_{mean} + I^*_{sd}}{Buf_{mean} + Buf_{sd}} \right],$$

where $F_I$ is the I frame dividing rate, $I_{mean}$ is the average value of the I frame, $I^*_{sd}$ is the variance of the I frame, $Buf_{mean}$ is the data receiving ability, and $Buf_{sd}$ is the variance of the data receiving ability.

3. The method for transmitting data stream according to claim 1, wherein the B frame dividing rate is calculated by the following formula:

$$F_P = \left[ \frac{P_{mean} + P^*_{sd}}{Buf_{mean} + Buf_{sd}} \right],$$

where $P_I$ is the P frame dividing rate, $P_{mean}$ is the average value of the P frame, $P^*_{sd}$ is the variance of the P frame, $Buf_{mean}$ is the data receiving ability, and $Buf_{sd}$ is the variance of the data receiving ability.

4. The method for transmitting data stream according to claim 1, wherein the B frame dividing rate is calculated by the following formula:

$$F_B = \left[ \frac{B_{mean} + B^*_{sd}}{Buf_{mean} + Buf_{sd}} \right],$$

where $B_I$ is the B frame dividing rate, $B_{mean}$ is the average value of the B frame, $B^*_{sd}$ is the variance of the B frame, $Buf_{mean}$ is the data receiving ability and $Buf_{sd}$ is the variance of the data receiving ability.

5. The method for transmitting data stream according to claim 1, wherein the I frame segments is calculated by the following formula:

$$f_i^I = \frac{FrameSize_i^I}{F_I},$$

wherein $f_i^I$ is the number of the I frame segments, $FrameSize_i^I$ is the size of the I frame and $F_I$ is the I frame dividing rate.

6. The method for transmitting data stream according to claim 1, wherein the P frame segments is calculated by the following formula:

$$f_i^P = \frac{FrameSize_i^P}{F_P},$$

wherein $f_i^P$ is the number of the P frame segments, $FrameSize_i^P$ the size of the P frame, and $F_P$ is the P frame dividing rate.

7. The method for transmitting data stream according to claim 1, wherein the number of the divided B frame is calculated by the following formula:

$$f_i^B = \frac{FrameSize_i^B}{F_B},$$

wherein $f_i^B$ is the B frame segments the number of, $FrameSize_i^B$ is the B frame the size of and $F_B$ is the B frame dividing rate.

8. The method for transmitting data stream according to claim 1, wherein the step of calculating the I frame dividing rate, the P frame dividing rate, and the B frame dividing rate of the stream according to the data receiving ability comprises:
calculating the I frame dividing rate, the P frame dividing rate, and the B frame dividing rate of one of a plurality of streams according to the data receiving ability.

9. The method for transmitting data stream according to claim 8, wherein the step of transmitting the I frame segments, the P frame segments, and the B frame segments of the stream to the computer in turn by the server according to the data receiving ability comprises:
transmitting the I frame segments, the P frame segments, and the B frame segments of the streams to the computer in turn by the server according to the data receiving ability.

* * * * *